United States Patent
Patel

(10) Patent No.: US 8,020,717 B2
(45) Date of Patent: Sep. 20, 2011

(54) PREFORM BASE AND METHOD OF MAKING A DELAMINATION AND CRACK RESISTANT MULTILAYER CONTAINER BASE

(75) Inventor: Tapan Y. Patel, Nashua, NH (US)

(73) Assignee: Graham Packaging Company, LP, York, PA (US)

( * ) Notice: Subject to any disclaimer, the term of this patent is extended or adjusted under 35 U.S.C. 154(b) by 1186 days.

(21) Appl. No.: 11/737,430

(22) Filed: Apr. 19, 2007

(65) Prior Publication Data
US 2008/0257855 A1    Oct. 23, 2008

(51) Int. Cl.
| B65D 1/02 | (2006.01) |
| B65D 23/02 | (2006.01) |
| B65D 23/08 | (2006.01) |
| B29D 22/00 | (2006.01) |
| B32B 1/02 | (2006.01) |
| B29C 49/12 | (2006.01) |

(52) U.S. Cl. ....... 215/375; 215/12.1; 215/373; 264/521; 264/523; 428/35.7; 428/542.8

(58) Field of Classification Search ................. 215/12.1, 215/373–375; 428/35.7, 542.8; 264/521, 264/523
See application file for complete search history.

(56) References Cited

U.S. PATENT DOCUMENTS

| 4,109,813 A * | 8/1978 | Valyi .......................... 215/12.1 |
| 4,330,579 A | 5/1982 | Ota et al. |
| 4,588,620 A * | 5/1986 | Marcinek .................. 428/36.92 |
| 4,609,516 A | 9/1986 | Krishnakumar |
| 4,725,464 A | 2/1988 | Collette |
| 4,785,949 A | 11/1988 | Krishnakumar |
| 4,910,054 A * | 3/1990 | Collette et al. ............... 428/35.7 |
| 4,915,992 A * | 4/1990 | Takakusaki et al. ....... 428/36.92 |
| 4,927,680 A | 5/1990 | Collette |
| 5,066,528 A | 11/1991 | Krishnakumar |
| 5,427,258 A | 6/1995 | Krishnakumar |
| 5,676,267 A * | 10/1997 | Slat et al. .................... 215/12.1 |
| 5,688,572 A * | 11/1997 | Slat et al. ................... 428/36.91 |
| 5,714,111 A * | 2/1998 | Beck et al. ..................... 264/532 |
| 5,728,347 A * | 3/1998 | Collette et al. ................ 264/512 |
| 5,829,614 A * | 11/1998 | Collette et al. ................ 215/375 |

(Continued)

FOREIGN PATENT DOCUMENTS

EP    0 494 098 A    7/1992

(Continued)

OTHER PUBLICATIONS

International Search Report and Written Opinion in corresponding PCT/US2008/060601 mailed Aug. 11, 2008.

*Primary Examiner* — Sue A Weaver
(74) *Attorney, Agent, or Firm* — Rissman Hendricks & Oliverio LLP

(57) ABSTRACT

Molded preform for blow molding a plastic container for pressurized applications, the preform having a base with a multilayer wall for forming a delamination and crack resistant multilayer footed container base. The preform base forming region has an end cap portion with a non-spherical inner wall, including a flattened central section joined by arcuate corner sections to a generally cylindrical outer section. The inner wall sections provide a varying end cap thickness profile which enhances orientation in select portions of the footed container base for improved performance and/or light-weighting of the container base.

42 Claims, 13 Drawing Sheets

U.S. PATENT DOCUMENTS

| | | | | |
|---|---|---|---|---|
| 5,888,598 | A | * | 3/1999 | Brewster et al. ............ 428/35.7 |
| 5,906,285 | A | * | 5/1999 | Slat .............................. 215/12.2 |
| 5,989,661 | A | | 11/1999 | Krishnakumar |
| 6,248,413 | B1 | * | 6/2001 | Barel et al. ................... 428/35.7 |
| 6,413,600 | B1 | * | 7/2002 | Slat .............................. 428/35.7 |

FOREIGN PATENT DOCUMENTS

| | | |
|---|---|---|
| JP | 57 008123 A | 1/1982 |
| JP | 2004 090425 A | 3/2004 |

\* cited by examiner

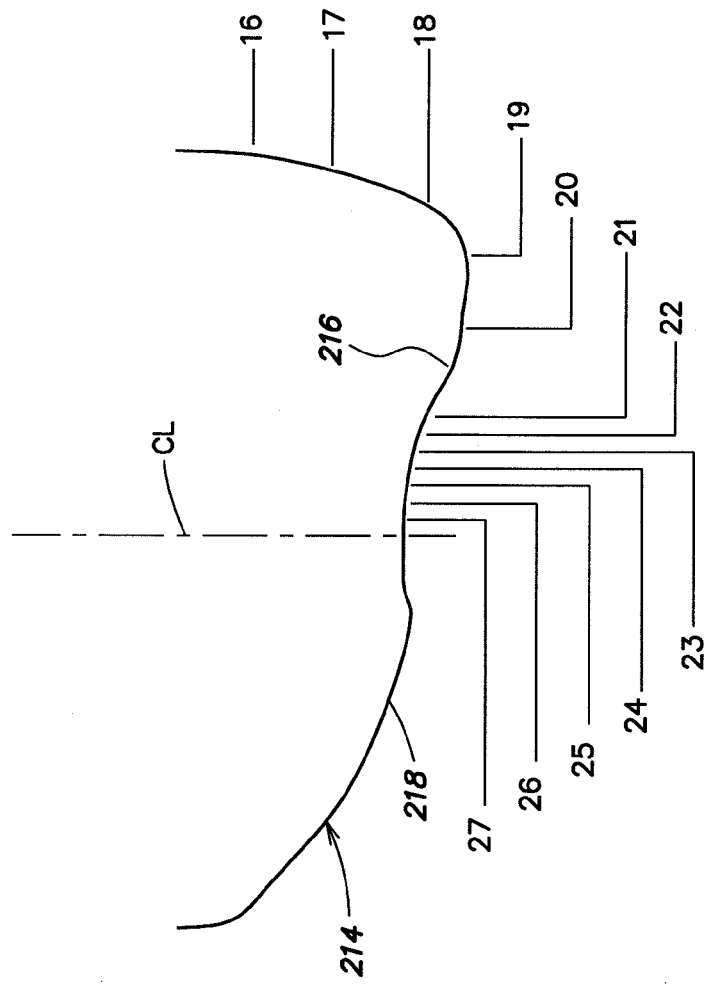
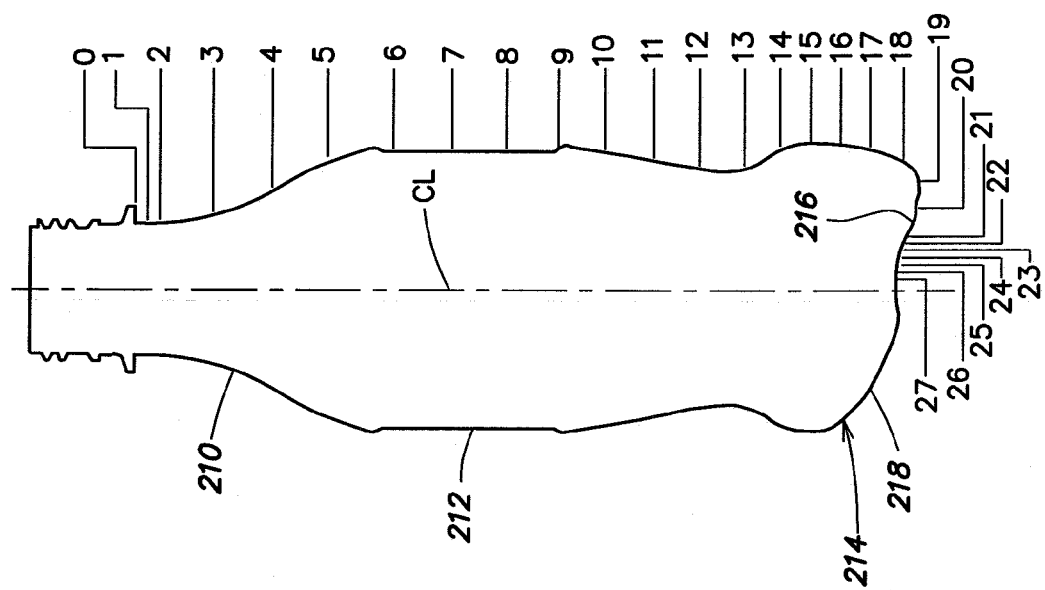
FIG. 4c
FIG. 4b

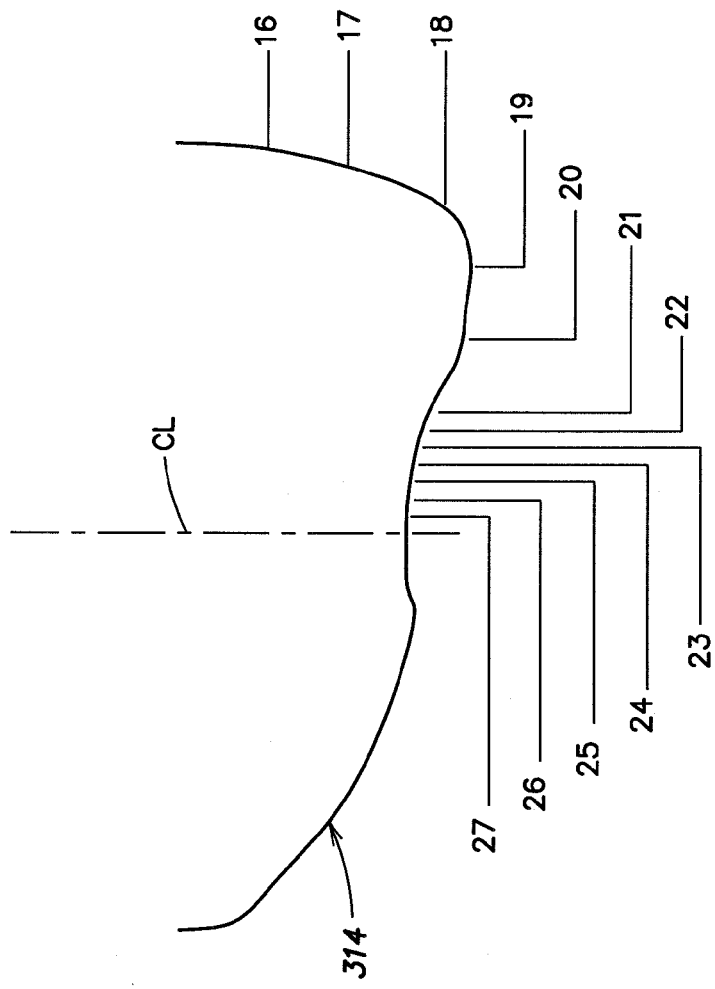
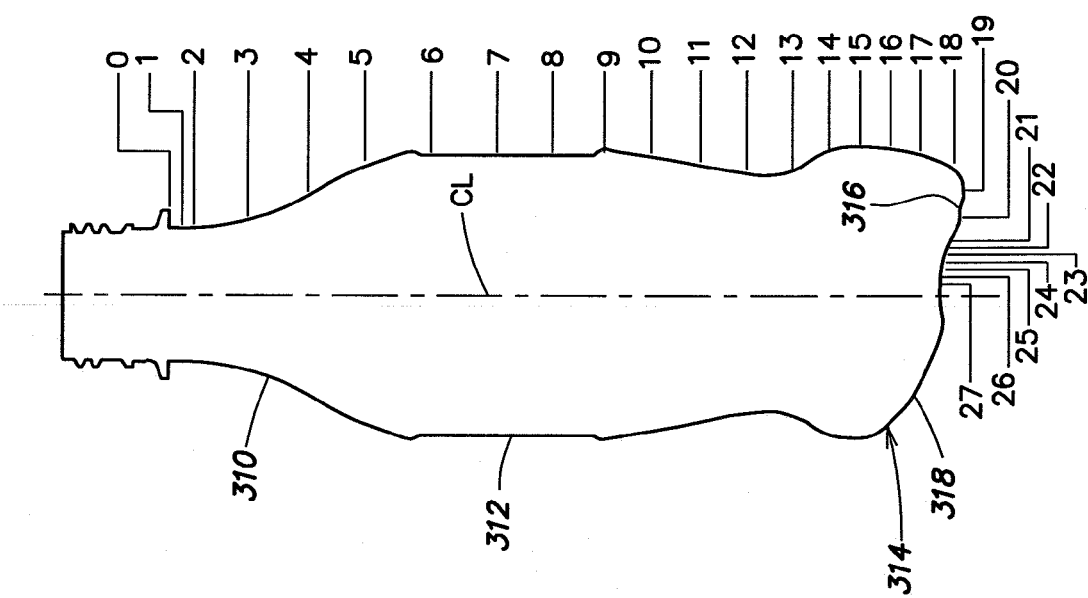

PREFORM BASE AND METHOD OF MAKING A DELAMINATION AND CRACK RESISTANT MULTILAYER CONTAINER BASE

FIELD OF THE INVENTION

This invention relates to pressurized plastic containers and to a preform and method enabling production of a lighter-weight multilayer footed container base having delamination and crack resistance.

BACKGROUND OF THE INVENTION

Transparent blow-molded polyester containers are the de facto standard for carbonated soft drinks (CSD), and are increasingly being used for other pressurized beverages (e.g., juice and beer). The polyester most commonly used, polyethylene terephthalate (PET), can provide superior clarity, pressurized strength, recyclability and ease of manufacture, at a competitive price.

One of the most successful pressurized PET containers has a five-foot base design as described in Krishnakumar U.S. Pat. No. 4,785,949. The base includes a generally hemispherical bottom wall with five outwardly projecting feet symmetrically disposed about the circumference of the base. Following widespread adoption of the Krishnakumar 5-foot base, there have been numerous development efforts to modify this base, including use of elliptical (rather than generally hemispherical) bottom walls, adjustments to the size of the foot pad (on which the bottle rests), and modifications to the rib area between the feet (which can be susceptible to stress concentrations and stress cracking). For example, adjustments in the relative proportions of the feet and rib area may effect the pressure deformation (creep) of the container base, while adjustments in the depth and width of the feet may affect the ease of manufacturability (blow molding) of the feet. Two common problems are underformation of the feet, creating "rockers" which lack a uniform standing surface, and stress whitening, the creation of visual defects due to overstretching and/or cold stretching of the feet.

In these development efforts it is generally desirable to light weight the container base as much as possible in order to reduce the material cost. However, light-weighting has generally been accompanied by a reduction in base performance, such as increased creep and/or stress cracking.

Certain applications require a pressurized container incorporating one or more gas barrier materials, typically as a multilayer structure including one or more barrier layers alternating with one or more structural layers. However, pressurized multilayer containers often have a problem with layer delamination, either during pressurized filling, or later during storage and use.

Burst pressure is a commonly specified parameter which defines the minimum or average pressure at which containers can be filled without substantial evidence of cracking and/or delamination. Drop impact is another test for delamination and crack resistance. In one drop impact test a filled and capped container is dropped from a height of six feet onto a hard (e.g., steel) surface and then inspected for layer separation, crack formation, and potential crack failure (leakage). There are also simulated storage tests, at elevated temperatures and pressures, which provide an indication of performance under expected conditions of warehouse and/or retail storage and use.

Due to variations in thickness and orientation in different parts of the base, the base of a pressurized multilayer container is particularly susceptible to cracking, creep and delamination. For example, the central base region may be thickened and substantially amorphous, the ribs (between the feet) may be thinner and have a modest level of orientation, and the feet may be even thinner and have a relatively high level of orientation. The transition areas, where different levels of orientation and thickness meet, are areas of stress concentration and a likely source of base failure. In contrast, the substantially cylindrical and highly biaxially oriented sidewall of the container is less likely to fail.

It would be desirable to provide a pressurized plastic container having a multilayer footed base which provides pressure and delamination resistance, and in particular to provide a preform and corresponding container base design which can be light weighted and still provide pressure and delamination resistance.

SUMMARY OF THE INVENTION

In one embodiment, a molded preform is provided for blow molding a plastic container for pressurized applications, the preform having a base with a multilayer wall for forming a delamination and crack resistant multilayer footed container base. The preform base-forming region includes:

a generally cylindrical upper base portion;

an end cap portion having a generally spherical outer wall and a nonspherical inner wall, the nonspherical inner wall having a flattened central section joined by arcuate corner sections to a generally cylindrical outer section forming an extension of the cylindrical upper base portion, wherein the inner wall sections respectively provide a varying end cap thickness profile comprising:

a central thickened end cap region;

an intermediate end cap region which is thinner than the central region; and an outer end cap region which is thicker than the intermediate region.

In various embodiments, the multilayer wall may include at least one layer of a polyester material. The multilayer wall may further include, adjacent to the at least one polyester layer, a layer of a different polyester or nonpolyester material. The adjacent layer may be of a barrier material, e.g., for one or more of oxygen, moisture and carbon dioxide.

The end cap thickness profile can enable a reduction in container base weight for at least an equivalent pressure resistance, compared to a spherical end cap profile having spherical inner and outer walls and the same upper base portion.

The end cap thickness profile can enable a reduction in container base weight for at least an equivalent delamination resistance, compared to a spherical end cap profile having spherical inner and outer walls and the same upper base portion.

The end cap thickness profile can enable a reduction in intrinsic viscosity of the polyester polymer for at least an equivalent crack resistance, compared to a spherical end cap profile having spherical inner and outer walls and the same upper base portion.

The pressurized applications may include the holding of a pressurized product (e.g. carbonated beverage), or processes which cause an increased pressure in the container for at least some period of time (e.g., pasteurization or retort). Particular applications include a single-use beverage container for pressurized liquids (e.g., carbonated soft drink), a single-use pasteurizable container (e.g., beer), a retortable food container, and a refillable carbonated soft drink container.

In another embodiment, a method is provided for making a delamination and crack resistant multilayer footed base of a plastic container for pressurized applications, the method including:

providing a molded preform having an end cap region including a multilayer wall; the wall;

the end cap region including a generally spherical outer surface and a relatively flattened central inner surface providing an end cap thickness profile which includes extending radially outwardly from a central longitudinal axis of the preform:
- a central thickened end cap region;
- an intermediate end cap region which is thinner than the central region; and
- an outer end cap region which is thicker than the intermediate region; blow molding the preform to form a plastic container for pressurized applications having a delamination and crack resistant multilayer footed base.

In one embodiment, the preform is an injection molded preform and is reheat stretch blow molded to form the container.

The formed container base may have a plurality of foot pads on which the container rests. During blow molding, the central end cap region may form a central thickened portion of the container base, while the intermediate end cap region forms a transition region between the central portion and the foot pads. The transition region may have at least 10% greater orientation compared to a transition region of a container base made from a preform having a spherical end cap profile with spherical inner and outer surfaces. The transition region may include an inner wall portion of each foot and an inner rib portion between two feet.

In various embodiments, the end cap thickness profile may provide a weight reduction in the container base of at least 5% compared to a container base made from a preform having a spherical end cap profile with spherical inner and outer surfaces. In further embodiments, the weight reduction may be at least 10%.

In one embodiment, the container has a pressurized shelf life of at least 8 weeks. In another embodiment, the pressurized shelf life is at least 16 weeks.

In one embodiment, the preform is formed into a carbonated beverage container having a volume of 500 milliliters (ml) or less. In other embodiments, the volume is 250 ml or less.

For example, the container may be a 250 ml carbonated soft drink container. The container may have a minimum burst pressure of at least 150 pounds per square inch (psi). The container may have an average burst pressure of at least 175 psi. The base weight may be no greater than 6 grams (g). Alternatively, the base weight may be no greater than 4 g.

In another embodiment, the preform is formed into a carbonated beverage container having a volume of 1 to 3 liters (l).

A stretch rod may be used in the blow molding process. The stretch rod may have a flattened tip which engages the intermediate thickness end cap region of the preform.

The resulting container is useful in many applications. For example, the container may be a single-use food or beverage container adapted for at least one of hot filling, cold filling, pasteurization and retort. The container may be a pasteurizable beer container. The container may be a retortable food container.

In another embodiment, an improved injection molded preform is provided for blow molding a single-use plastic beverage container for pressurized liquids having a multilayer footed base. The preform has an end cap region including a multilayer wall with a layer of polyester material and an adjacent layer of a different polyester or nonpolyester material. The improved preform includes:

a non-spherical end cap region to form a delamination and crack resistant pressurized container base of reduced weight, wherein the non-spherical end cap region has a thickness profile which includes:
- a relatively flattened central inner surface forming a central thickened end cap region;
- an intermediate region surrounding the central region which is thinner than the central region; and
- an outer end cap region surrounding the intermediate region which is thicker than the intermediate region.

BRIEF DESCRIPTION OF THE FIGURES

FIG. 1e is an enlarged cross-sectional view of the multilayer (5-layer) wall of the container;

FIGS. 2a-2c are cross-sectional views illustrating differences in three preform base designs, wherein FIG. 2a illustrates an embodiment of the present invention, and FIG. 2b-2c illustrate comparison preform designs.

FIGS. 4a-4c are cross-sectional views of one embodiment of the invention, including a preform (17 g flat tip preform design in FIG. 4a), resulting blow-molded container (FIG. 4b) and enlarged container base (FIG. 4c); scribe lines are marked along each of the preform and container to illustrate relative dimensional and expansion characteristics;

FIGS. 5a-5c are similar to FIGS. 4a-4c but for a comparison preform/container pair; and FIGS. 6a-6b are graphs showing rib wall thicknesses (FIG. 6a) and foot wall thicknesses (FIG. 6b) versus position along the container base, for each of the containers of FIGS. 4-5, while

DETAILED DESCRIPTION

It is believed that when filling a carbonated soft drink container at for example, 4.2 volumes of $CO_2$, the increase in pressure on the central dome creates a downward force which can result in downward movement of the dome. When the central dome moves down, this creates stress on the transition region between the central dome and foot pads. The present invention solves this problem by providing a preform base design having a non-spherical inner surface which produces a preform base thickness profile that results in less movement of the central dome and greater orientation in the transition region between the central dome and foot pad.

One embodiment of the invention will now be described for making a 250 milliliter (ml) carbonated soft drink (CSD) bottle having a multilayer sidewall and base. By utilizing a new preform design, a container is made that provides a desired level of crack and delamination resistance while reducing the material in the container base (lightweighting the base). More specifically, the resulting container provides a desired burst pressure, drop impact strength and delamination resistance, while maintaining a desired level of carbonation pressure, over a 16 week shelf life. This embodiment is set forth by way of example only, and is not meant to be limiting.

Figure 1B:
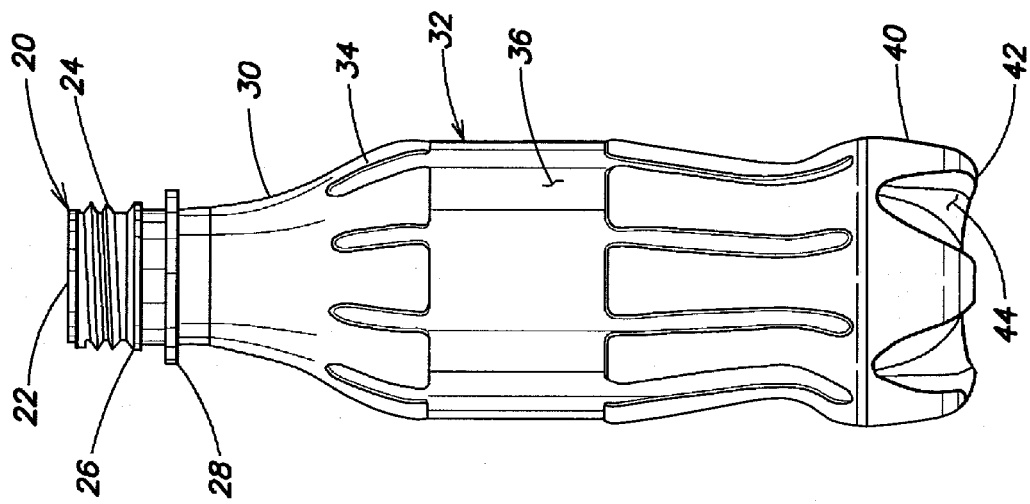
FIGS. 1a-1e are multiple views of a 250 ml carbonated soft drink bottle according to one embodiment of the invention, FIG. 1a being a top perspective view, FIG. 1b a side plan view, FIG. 1c a bottom plan view, and FIG. 1d a cross-sectional view.
Figure 1E:
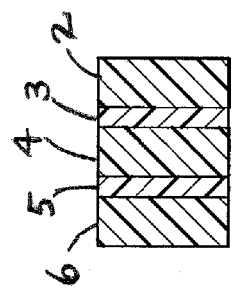
Figure 1A:
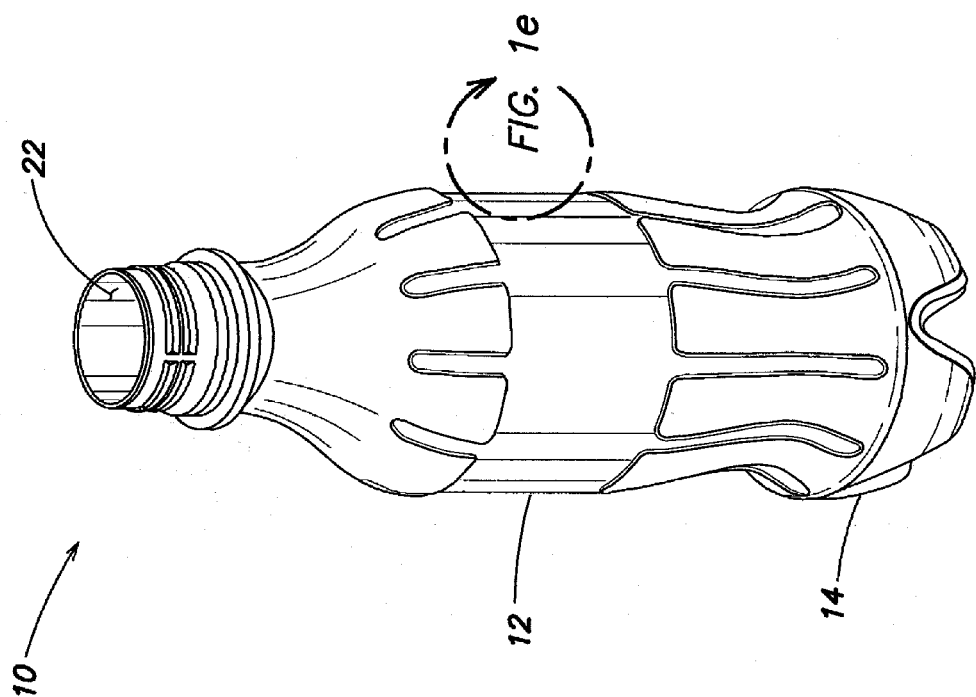
Figure 1D:
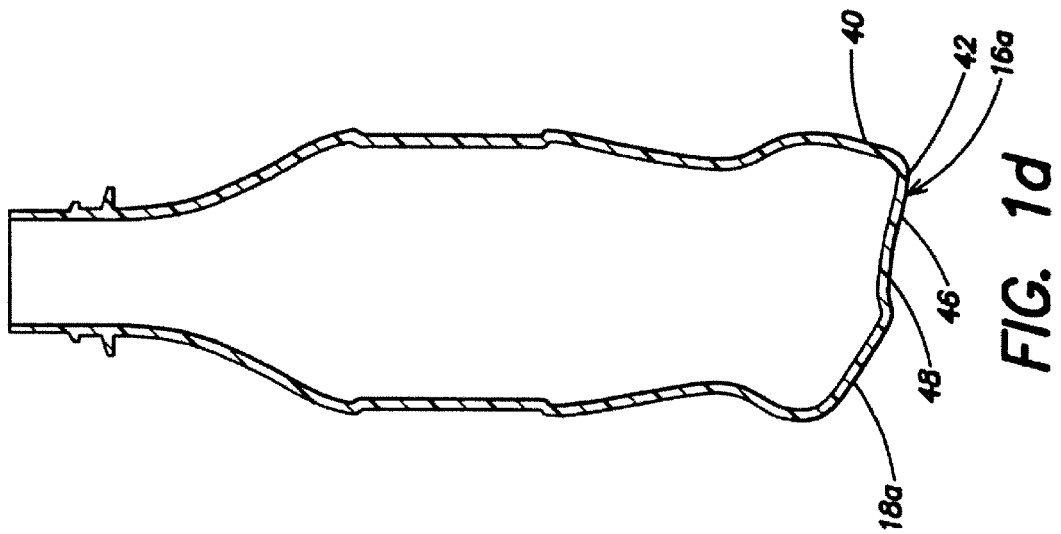
Figure 1C:
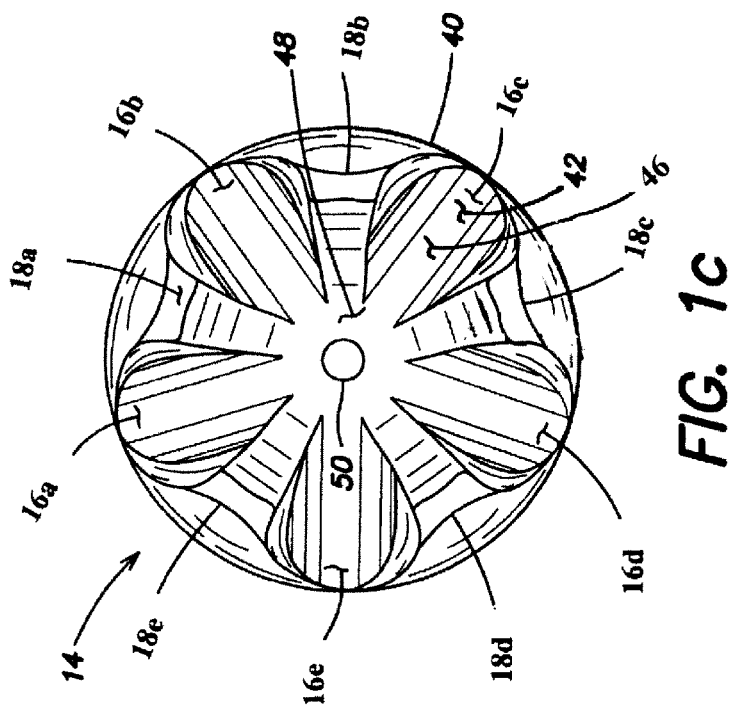

FIGS. 1a-1d show multiple views of the container. The container 10 is a 250 ml (single-serve), non-returnable (single-use) carbonated soft drink bottle having multiple layers in both the sidewall 12 and base 14. FIG. 1a is a top perspective view of the container and FIG. 1b a side plan view. FIG. 1c is a bottom plan view showing the footed container base 14 with five feet 16a-e symmetrically disposed around the circumference of the base, and five intervening ribs 18a-e disposed between the feet. FIG. 1d is a cross-sectional view of the sidewall and base, illustrating in cross section one rib 18a (on the left) and one foot 16a (on the right) of the base.

The sidewall and base in this example include five layers (see FIG. 1e): outer PET 2, intermediate barrier 3, core PET 4, intermediate barrier 5, and inner PET 6. The barrier material is SurBond-E (Graham Packaging Co., York, Pa.), a commercial blend of ethylene vinyl alcohol (EVOH) barrier resin to which a polyethyleneimine (PEI) polymer has been added for improved adhesion to adjacent PET layers (see P. Bourgeois U.S. 2005/0084635 A1 published 21 Apr. 2005, "Delamination-Resistant Multilayer Container, Preform, Article and Method of Manufacture"). The barrier layers are relatively thin compared to the outer, core and inner PET layers. This multilayer construction is just one example and not meant to be limiting. For example, multilayer preforms and containers with 2 to 7 layers are in widespread use, made from 2, 3 or more different materials. Also, although the multilayer wall in the sidewall and/or base is generally substantially continuous, this is not required. There may be, for example, a gap in one or more layers in the center of the base. Thus, as used herein a preform/container having a multilayer base does not require a continuous multilayer wall across the entire base. Also, while the barrier layer in this example includes an additive for improved layer adhesion, in other embodiments this is not provided.

The container includes an upper neck finish 20 having an open mouth 22 for receiving the carbonated beverage, and outer threads 24 for receiving a screw-on cap (not shown). The neck finish further includes a tamper proof ring 26 below the threads and a lowermost support ring 28. Below the support ring the blow-molded container body includes a sidewall region 12 and a base region 14. The sidewall includes an upper tapered shoulder portion 30 and a substantially cylindrical panel portion 32 with a recessed label-attachment area 36. The shoulder and panel may have structural or decorative ribs (e.g., ribs 34) or rings. The contour and/or ribbed appearance of the container shown in FIG. 1 may be considered a trade dress or otherwise the property of The Coca-Cola Company, Atlanta, Ga.; however, they form no part of the present invention.

Below the panel is the base region 14. The base includes five feet 16a-e of the same dimensions symmetrically disposed around the circumference of the base. The feet project downwardly from a central outwardly convex dome 44, while the ribs 18a-e form portions of the dome area between the feet. Each foot has a lowermost foot pad 42 on which (collectively) the bottle rests, and radially outwardly of the foot pad each foot has an outer wall 40 (forming an outer base wall) which extends radially outwardly and upwardly to join the panel 32. Radially inward of the base standing region (foot pads 42), each foot has an inner wall 46 extending radially inwardly and upwardly to merge with a central dome region 48. At the center of the dome (defined by a vertical centerline CL of the container) there may be (optionally) an outwardly extending cylindrical projection known as the gate 50 (see FIG. 1c). The gate is a remnant of the injection molding process, i.e., the preform from which the container has been stretch blow molded, and may or may not be preserved or eliminated during blow molding.

On the right side of FIG. 1d, a cross-section of one foot 16a is shown. The outer wall 40 of the foot slopes downwardly toward the standing area (foot pad) 42, and radially inwardly thereof an upwardly sloped inner wall 46 blends into the central dome region 48. On the left side of FIG. 1d, a cross-section of one rib 18a is shown. The rib has a generally flattened (angled) configuration, as opposed to a strictly hemispherical shape. The dome (forming the ribs) may be hemispherical, elliptical, angled, or some combination thereof. These general features of the container neck finish, sidewall, and base (feet and ribs) are not specific to the present invention, but are described only for illustrative purposes.

Figure 2A:
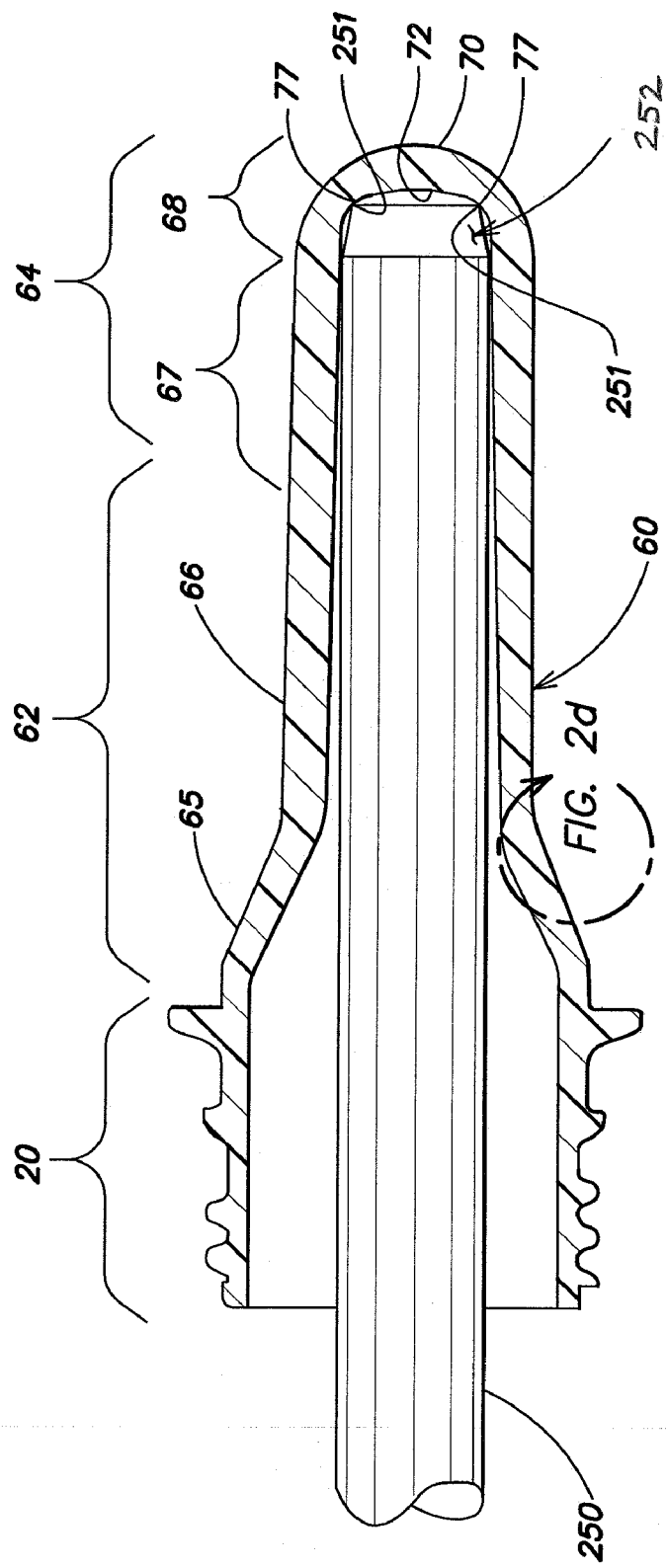
Figure 2D:
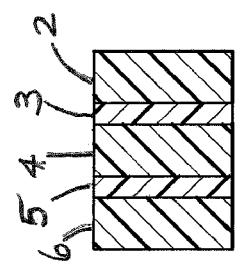
FIG. 2d is an enlarged cross sectional view of the multilayer wall of the preform (same in each of FIGS. 2a-2c)
Figure 2B:
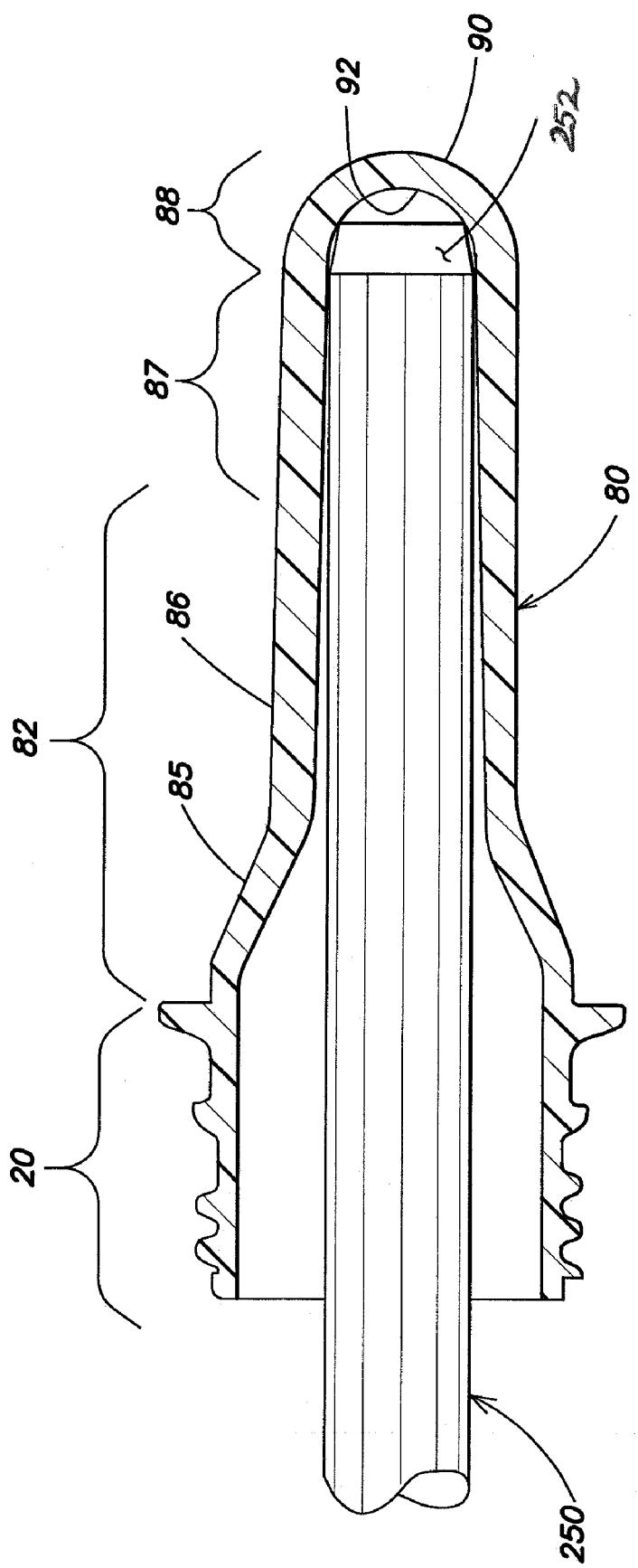
Figure 2C:
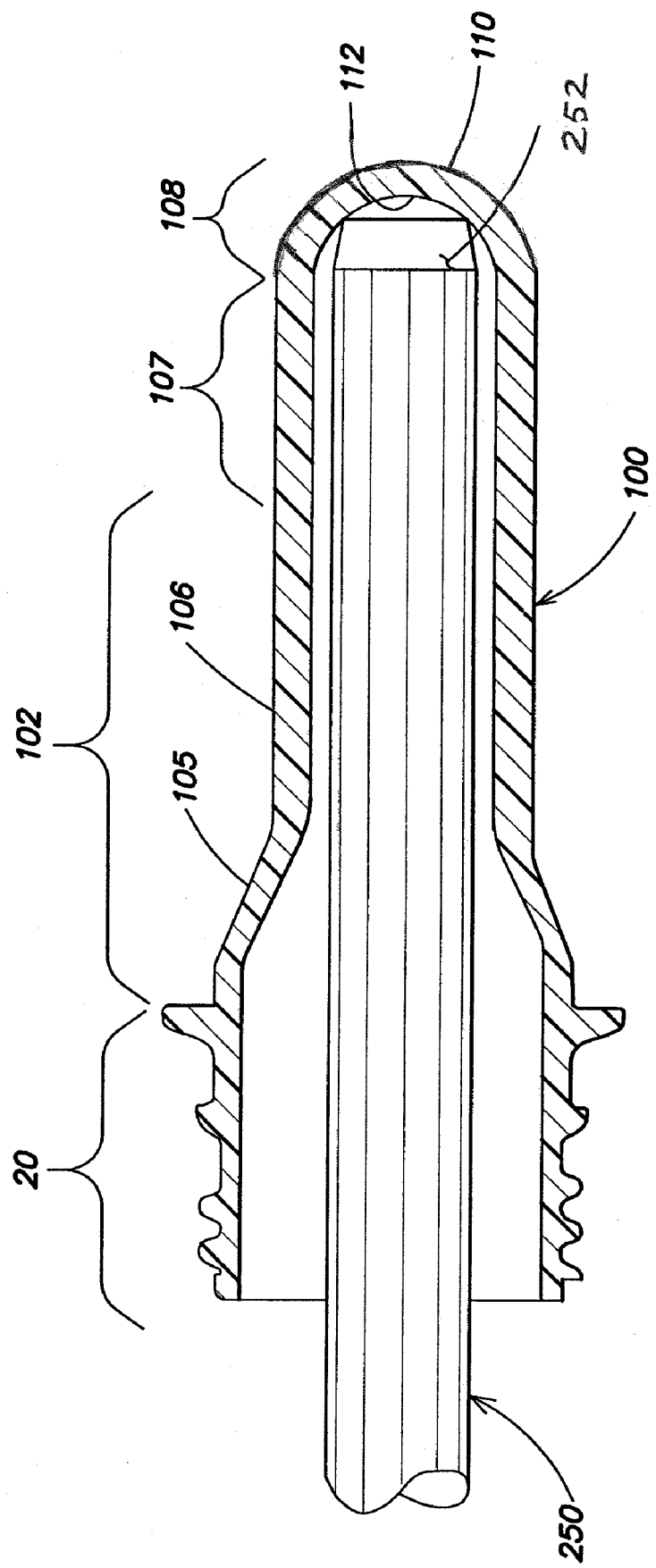
Figure 3:
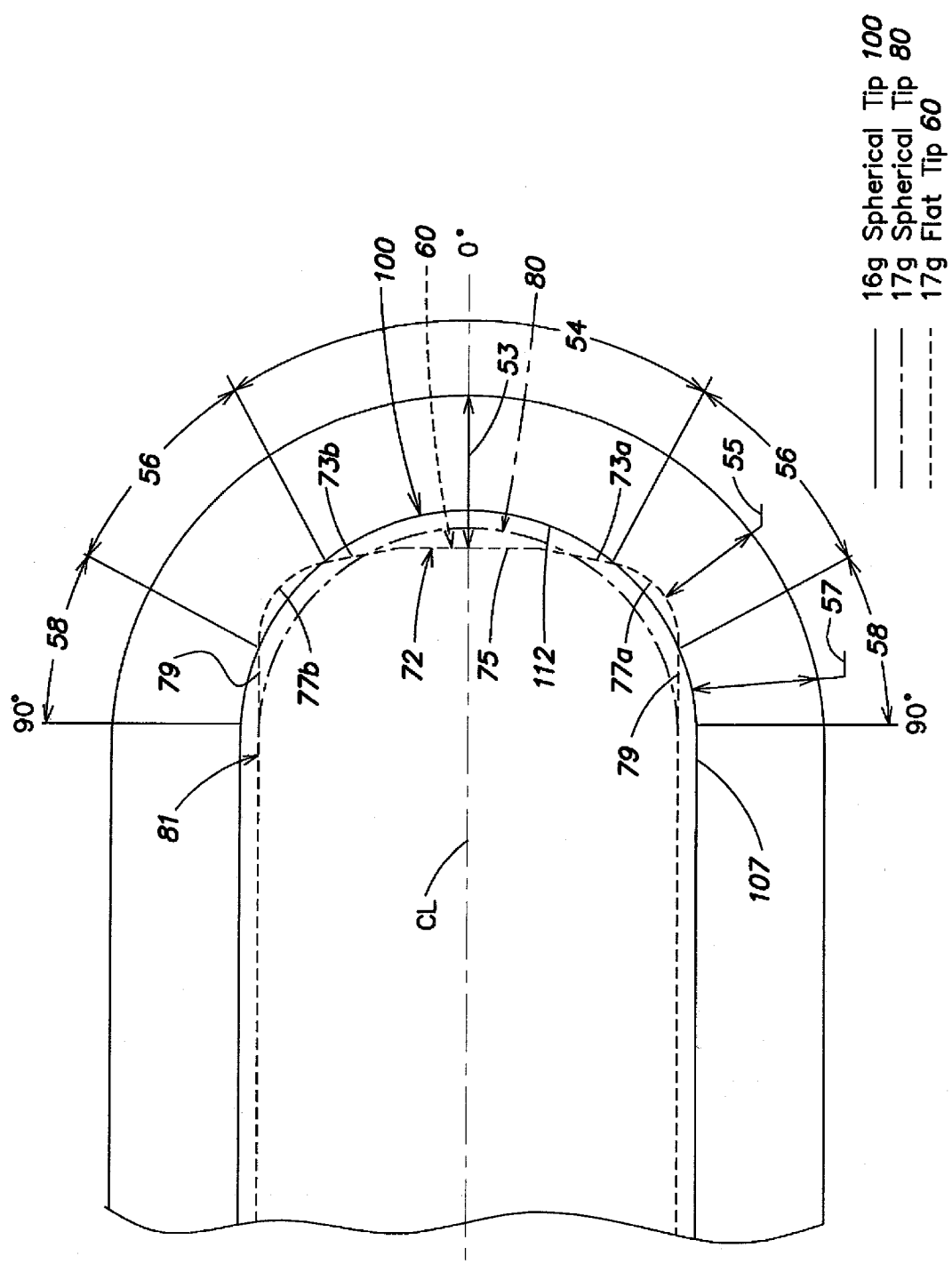
FIG. 3 shows combined (overlaid) enlarged cross-sectional views of the three preform base designs of FIGS. 2a-2c for purposes of illustrating the differences.

FIGS. 2a-2c illustrate for comparison purposes one embodiment of a new preform base design according to the invention (FIG. 2a), and two other base designs (FIGS. 2b-2c). FIG. 2a shows a 17 gram (g) preform 60 having the new base design, also referred to herein as the "17 g flat tip" design. A stretch rod 250 is shown disposed within the preform 60. The stretch rod has a modified tip 252 (shortened and flattened compared to a spherical stretch rod tip that would generally match the inner wall of a spherical end cap) to accommodate the relatively flat interior end cap wall of the new 17 g flat tip design. The lowermost edge 251 of the flattened stretch rod tip 252 engages the inner arcuate wall 77 of the outer corner region 56 (as shown in FIG. 3) during the stretch blow molding process. FIG. 2d shows the multilayer preform wall (same layer structure as the container of FIG. 1e); in this embodiment the multilayer structure is provided in both the body and base of the preform/container.

The preform 60 includes an upper neck finish portion 20, which is the same as the neck finish 20 of the container of FIG. 1. Thus, the preform includes an open mouth, outer threads, tamper proof ring, and support ring. Below the support ring the preform body 62 includes a shoulder portion 65 and below the shoulder a substantially cylindrical body portion 66. The shoulder portion 65 shown herein has inwardly tapering inner and outer diameters; alternative preform designs may have outwardly tapering walls or no taper. Below the body portion is a base portion 64, which will form the base 14 of the container 10, and which includes an upper generally cylindrical base portion 67 and below that an end cap region 68. There may be some taper to the generally cylindrical inner and outer walls of the body 66 and upper base 67 portions.

The preform 60 is expanded during a reheat stretch blow molding process, wherein the preform is heated and then expanded such that the preform shoulder region 65 forms the container shoulder 30, the cylindrical preform body region 66 forms the container panel portion 32, and the upper base portion 67 and end cap region 68 together form the footed container base 14. Of particular importance here is the new preform end cap region 68, having a substantially spherical outer surface 70 and, in contrast to the more typical (prior art) spherical inner surface, a modified (flattened) inner surface 72 which produces a modified thickness profile in the preform base as described below.

As a basis of comparison, FIG. 2b is a cross-section of a "17 g spherical tip" preform 80, having the same neck finish 20, shoulder 85, cylindrical body 86 and upper base 87 as the preform of FIG. 2a (20, 65, 66 and 67 respectively in preform 60), but having an end cap 88 with substantially spherical inner 92 and outer 90 surfaces. The same stretch rod 250 is shown in preform 80. This preform design is used for purposes of illustration only and is not considered part of the state of the art; it is presented solely for comparison purposes.

Also for comparison, FIG. 2c is a cross section of a "16 g spherical tip" preform 100, having the same neck finish 20 and shoulder 105 as the preforms of FIGS. 2a and 2b. The same stretch rod 250 is shown. However, the cylindrical body 106 and upper base 107 of preform 100 are of a lesser radial wall thickness than that of preforms 60 and 80 (i.e., 106 and 107 have a larger inner diameter); the radial wall thickness of the end cap 108 is also thinner than that of the 17 g spherical tip design (88). These differences will be apparent in the combined cross sectional views in FIG. 3, wherein the upper base and end cap regions of each of the three preforms 60, 80 and 100 are overlaid for ease of comparison. Again, the preform design of FIG. 2c is used for purposes of illustration and is not considered part of the state of the art; it is presented solely for comparison purposes.

FIG. 3 is an overlay of the new 17 g flat tip base design (dashed lines), the 17 g spherical base design (broken lines), and the 16 g spherical base design (solid lines) to illustrate the differences in the inner surface contours and wall thicknesses in the three preform bases (of FIGS. 2a-2c respectively).

All three preforms 60, 80, 100 have the same outer wall contour and dimensions in both the upper base portions 67, 87, 107 and end cap regions 68, 88, 108. The 17 g flat tip (preform 60) and 17 g spherical tip (preform 80) also both have the same inner wall radius (contour and dimensions) in the upper base 67, 87; they differ in regard to the inner wall of the end cap, the 17 g spherical tip end cap 88 having a spherical inner wall (broken lines) and the 17 g flat tip end cap 68 having a non-spherical inner wall (dashed lines). As a further basis of comparison, the 16 g spherical tip design (shown in solid lines in FIG. 3) has a larger inner wall radius in the upper base portion 107 (and cylindrical body section 106), and has a substantially hemispherical inner wall 112 in the end cap.

The non-spherical inner wall 72 of preform end cap 68 has a flattened central wall section 75 which is joined by arcuate corner wall sections 77a, 77b to a generally cylindrical wall section 79 forming an extension of the inner wall 81 of the cylindrical upper base portion 67 (dashed lines). These three inner wall sections (75/77/79) of the 17 gram flat tip respectively provide a varying end cap thickness profile comprising: a central thickened end cap region 54; an intermediate end cap region 56 which is thinner than the central region 54; and an outer end cap region 58 which is thicker than the intermediate region 56. Thus, in comparison to a very gradual increase in thickness of the 17 gram spherical tip end cap (going from the CL to the junction with the generally cylindrical upper base portion 87), the 17 gram flat tip end cap thickness profile (relative thickness difference) is thick:thin:thick. Note that the wall thickness profile, within each of the regions 54, 56 and 58, varies while the relative thickness differences between the regions are maintained. Thus, FIG. 3 shows a representative first thickness 53 of the central region 54, a representative second thickness 55 (less than first thickness 53) of the intermediate region 56, and a representative third thickness 57 (greater than second thickness 55) of the outer region 58. In this example the outer region 58 is thinner than the central region 54, but this is not required; optionally it could be the same or thicker.

As best shown in FIG. 3, the flattened interior surface 75 of the new 17 g flat tip end cap region 68 forms a central thickened region 54 surrounding the central longitudinal axis CL of the preform. The flattened inner surface 75 here includes a central region 72 disposed transverse to the CL and a surrounding beveled area 73a, 73b as shown, i.e., the flattened interior surface 75 need not be strictly flat. Surrounding the central thickened region 54 (formed by flattened surface 75) is a thinner intermediate end cap region 56, which will provide greater (enhanced) orientation when stretch blow molded to form the container base (compared to a spherical base design). An outer end cap region 58 surrounds the intermediate region 56 and is thicker than the intermediate region 56. As described below, in this embodiment the outer region 58 will also be stretched to a greater degree (compared to a spherical base design).

The thickness profile of the preform base allows preferential stretching of the reduced thickness intermediate end cap portion 56 during blow molding compared to the thickened central portion 54. The thinner intermediate portion 56 will stretch first, leading to a higher stretch and orientation in the outer base 58 and at least a portion of the cylindrical upper base portion 67 (above the preform end cap). This provides a higher level of orientation in the transition area between the foot pad and the inner wall of the foot (compared to the spherical design). As a result, there is reduced movement of the central container base during pressurized filling and storage and thus results in greater delamination and crack resistance in the multilayer foot.

Figure 4A:
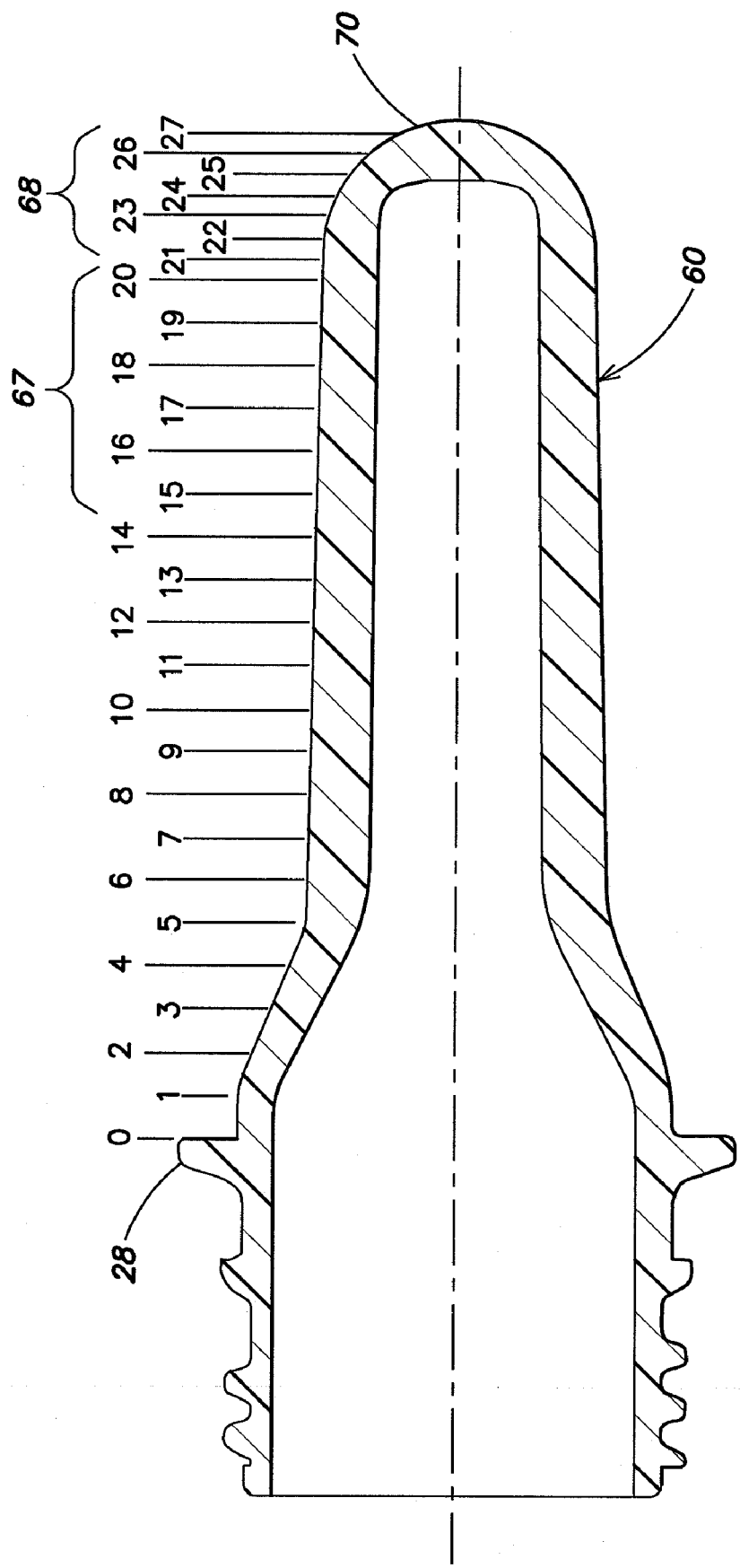
Figure 5A:
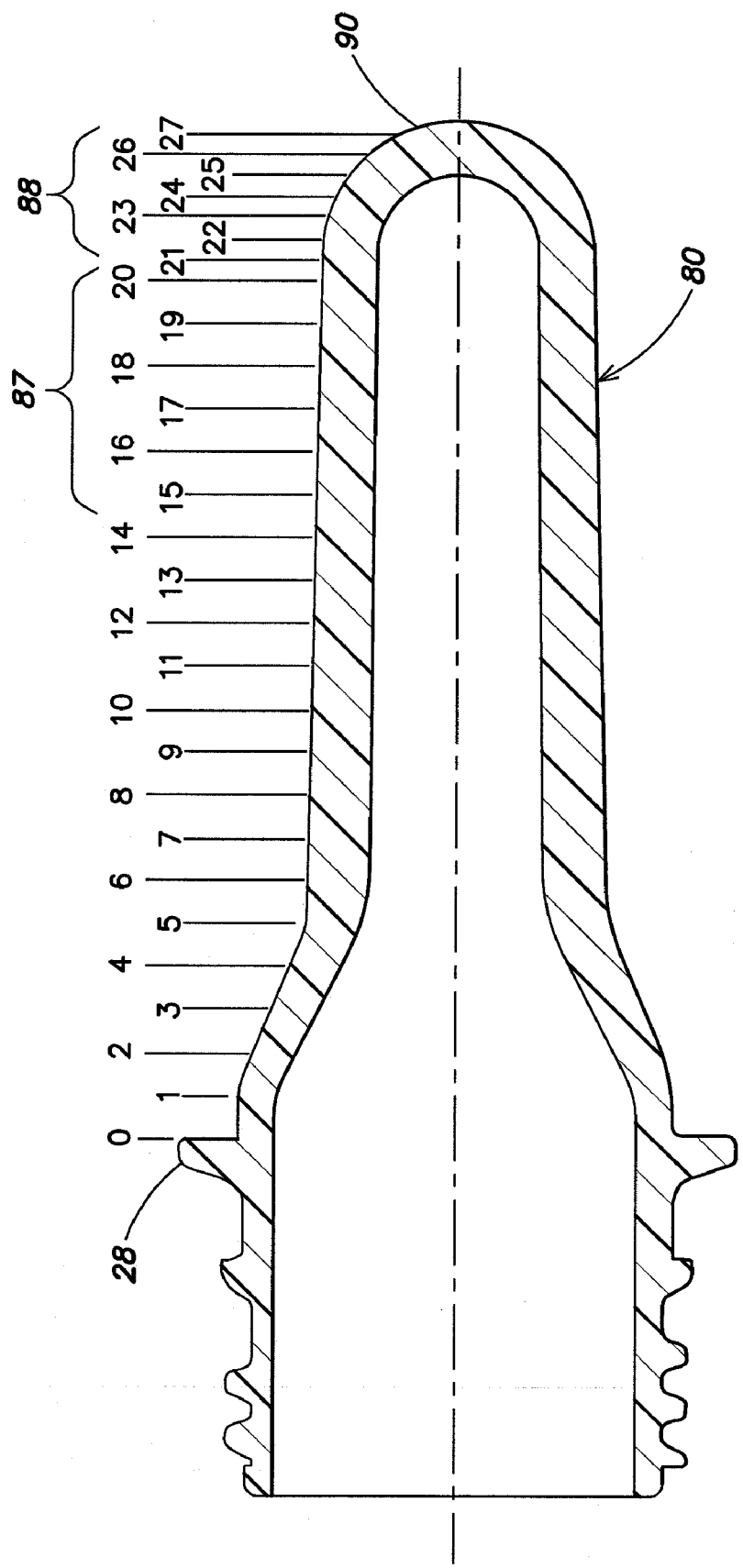

FIGS. 4-5 illustrate this difference in orientation resulting from blow molding a container base from a 17 g flat tip preform base (FIG. 4a), versus the 17 g spherical tip preform base (FIG. 5a). To enable this comparison, a sample of each of preform 60 (17 g flat tip) and preform 80 (17 g spherical tip) are marked with scribe lines 0 through 20 at intervals of 0.100 inches, starting from the lower surface of the support ring 28 and progressing down to line 20 in the upper base portion (67, 87, respectively). Additional scribe lines 20 through 27 are spaced 0.050 inches apart going from a lower part of the upper base portion 67, 87 and progressing down along the outer spherical wall (70, 90) of the end cap (68, 88).

The preforms 60, 80 are then blow molded to form a 250 ml carbonated beverage container (same as shown in FIG. 1). FIG. 4b shows a container 210 blown from the scribed preform 60 of FIG. 4a. The scribe lines 0-27 from the preform are shown in their corresponding positions on the container sidewall 212 and base 214. FIG. 4c is an expanded view of the base portion 214 of FIG. 4b.

Similarly, the scribed preform 80 of FIG. 5a was blow molded to form the container 310 shown in FIG. 5b, with FIG. 5c being an expanded view of the base portion 314 of FIG. 5b.

By measuring the distance from the vertical centerline CL to various scribe lines in the base, it was determined that the 17 g flat tip preform base provides greater orientation in the area between scribe lines 19 and 22, and most especially in the area between scribe lines 20 and 21. This greater orientation between lines 19 and 22 is based on the lesser thickness profile of the outer corner 56 and adjacent upper portion 58 of the end cap of preform 60 (compared to the spherical thickness profile of the end cap of preform 80). During blow molding, the lesser thickness profile of corner region 56 will stretch first, which will produce a greater stretch (orientation) in the region between 19 and 21 (the outer end cap 58 and cylindrical upper base 67), compared to the 17 g spherical tip design. The largest increase in orientation occurs between lines 20 and 21, a transition region of the bottle base between the foot pad 42 and central dome 48. It is this region that can be most prone to failure by stress cracking and for which, according to the new preform design, crack failure is substantially reduced.

Further evidence of improvements in weight and/or performance which can be achieved with this new preform thickness profile are described below. Again, these are based on a comparison of the 17 gram flat tip and the 17 gram spherical tip preform base design.

Table 1 below provides thickness profiles for one example each of the 17 g flat tip (run 2188) and 17 g spherical tip (run 2194) base designs. The thickness measurements are taken at various points along the preform end cap, starting at 0° (on the longitudinal center line CL) and moving outwardly and upwardly to the junction of the preform end cap and the cylindrical body sidewall (90° from the longitudinal center line as shown in FIG. 3). While the spherical end cap undergoes a relatively modest and steady thickness increase from 0° to 90° (from 0.1250 to 0.1379 inches), the flat end cap has a thick/thin/thick profile going from 0° to 90° (from 0.1400 at 0°, down to 0.1007 at 50°, and back up to 0.1383 inches at 90°).

TABLE 1

| Preform Description | 17 g Flat Tip (2188) | 17 g Spherical Tip (2194) |
|---|---|---|
| Radial Wall Thickness at 0° (CL), inch | 0.1400 | 0.1250 |
| Radial Wall Thickness at 10°, inch | 0.1372 | 0.1253 |
| Radial Wall Thickness at 20°, inch | 0.1296 | 0.1260 |
| Radial Wall Thickness at 30°, inch | 0.1199 | 0.1270 |
| Radial Wall Thickness at 40°, inch | 0.1048 | 0.1283 |
| Radial Wall Thickness at 50°, inch | 0.1007 | 0.1300 |
| Radial Wall Thickness at 60°, inch | 0.1102 | 0.1319 |
| Radial Wall Thickness at 70°, inch | 0.1266 | 0.1340 |
| Radial Wall Thickness at 80°, inch | 0.1357 | 0.1362 |
| Radial Wall Thickness at 90°, (Cylindrical Body), inch | 0.1383 | 0.1379 |

Table 2 below is a comparison of preform and container section weights for the same examples of the 17 g flat tip preform (run 2188), versus the 17 g spherical tip preform (run 2194). There is a significant drop in the preform end cap weight, from 1.29 g (spherical tip) down to 1.22 g (flat tip). There is a corresponding significant improvement (reduction) in the container base weight resulting from use of the 17 g flat tip design, versus the 17 g spherical tip design, namely 3.8 g versus 4.1 g. This is a significant light weighting of the container base, while providing the desired delamination and crack resistance.

TABLE 2

| Preform Description | Preform End Cap, g | Container Base, g | Container Lower Panel, g | Container Upper Panel, g | Container Neck Finish and Shoulder, g |
|---|---|---|---|---|---|
| 17 g Flat Tip (2188) | 1.22 | 3.8 | 3.0 | 2.4 | 8.2 |
| 17 g Spherical Tip (2194) | 1.29 | 4.1 | 2.8 | 2.2 | 8.2 |

Figure 6A:
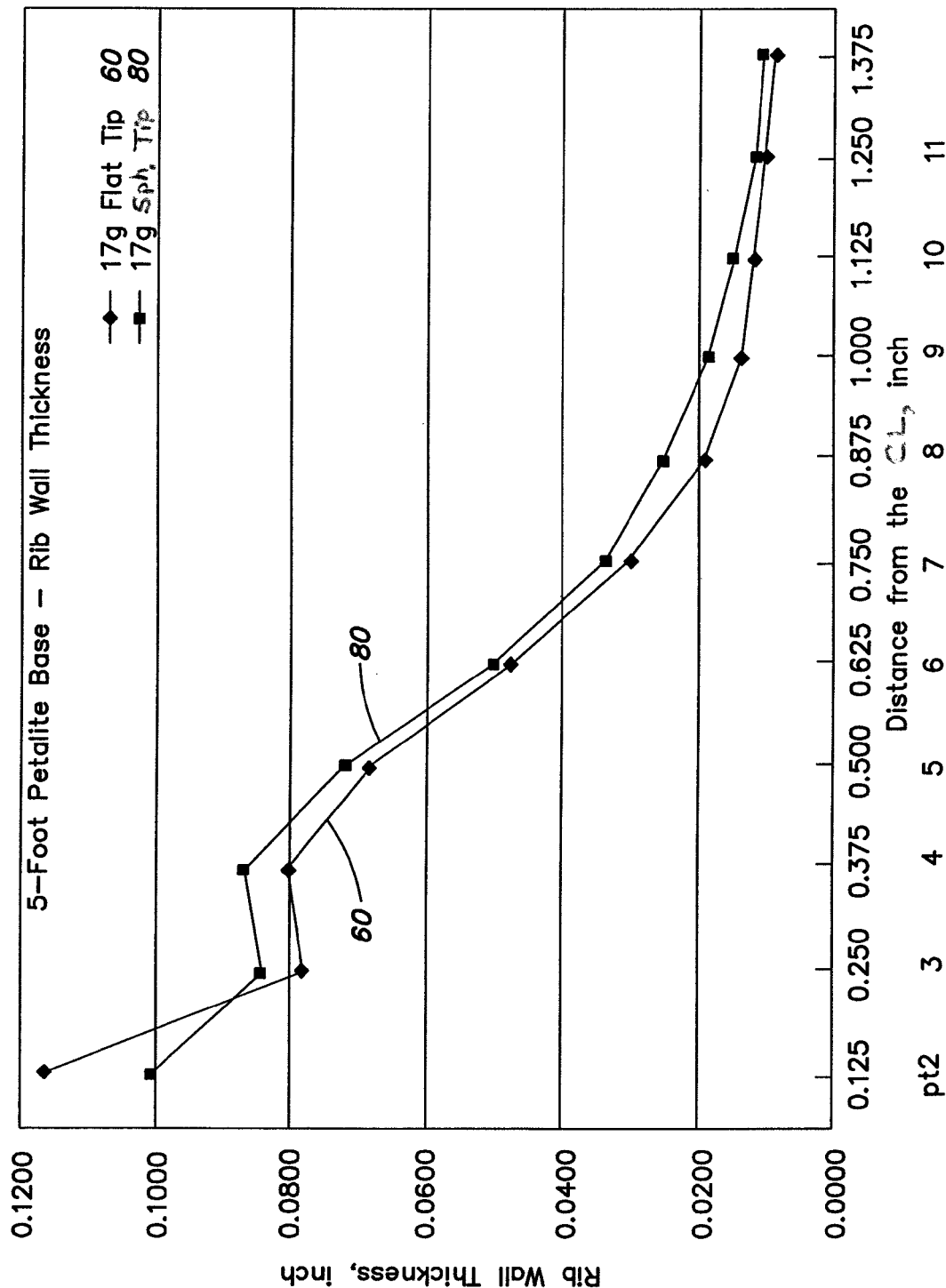
Figure 6B:
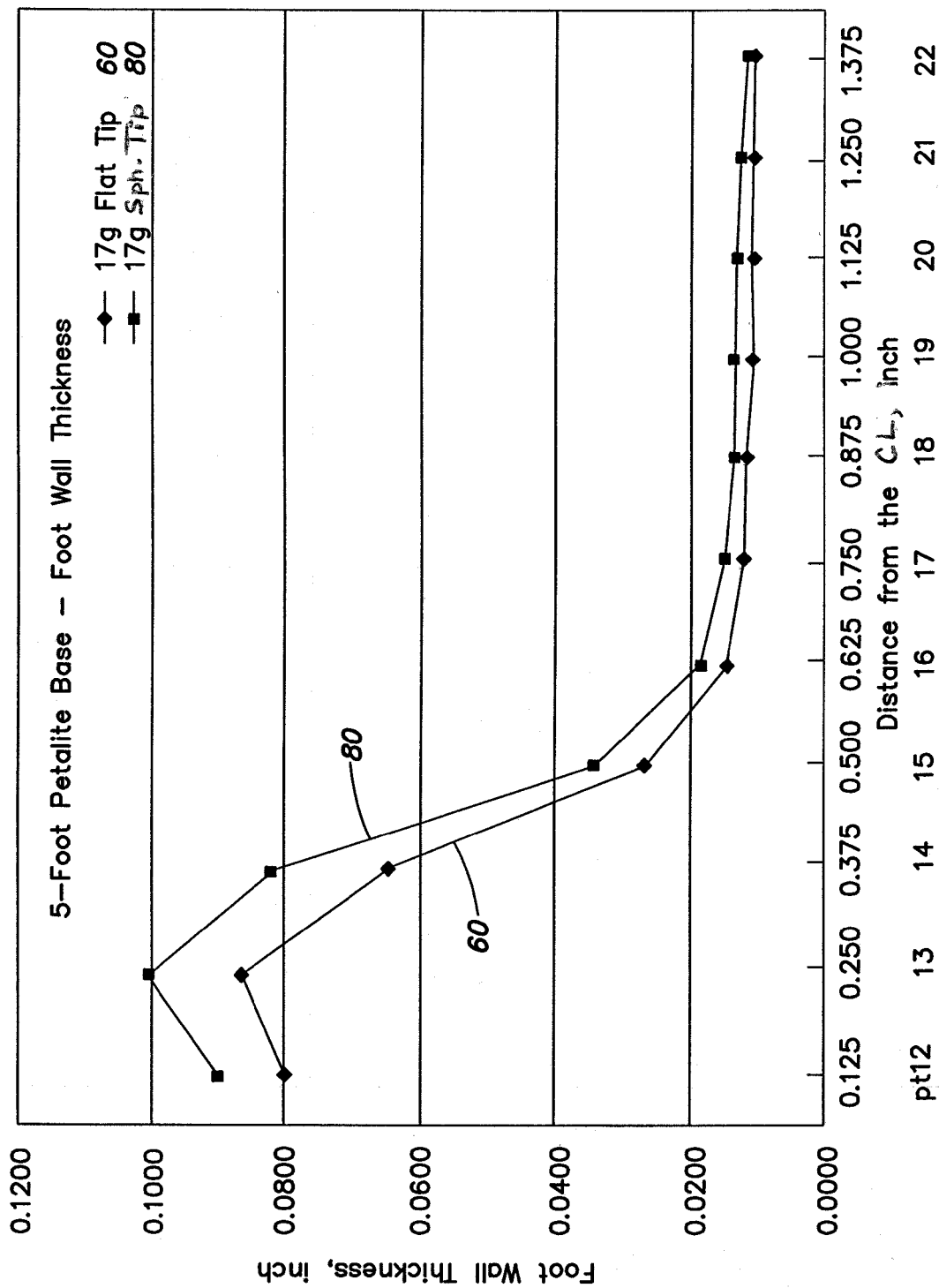
Figure 6C:
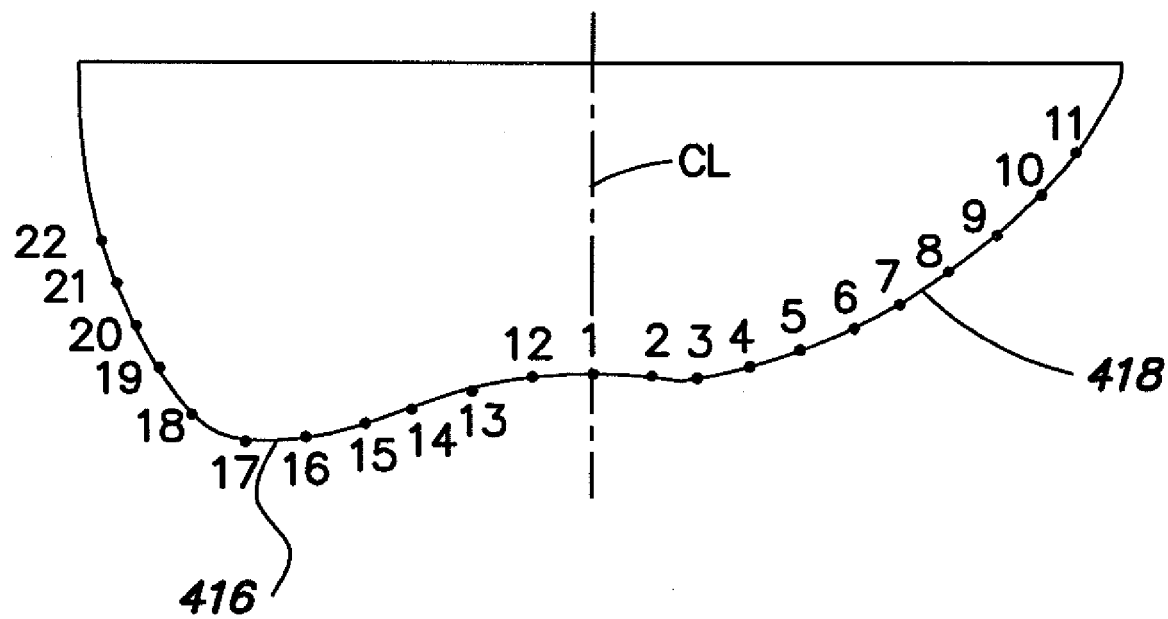
FIG. 6c is a cross-section of a container base showing 22 positional points along the base (as plotted on the horizontal axis in FIGS. 6a-6b).

FIGS. 6a-6c illustrate, for a series of positional points along the rib/foot (see FIG. 6c), a comparison of rib wall thicknesses (FIG. 6a) and foot wall thicknesses (FIG. 6b) for a container base made from the 17 g flat tip design, versus a container base made from the 17 g spherical tip design. FIG. 6c shows a cross section of a rib 418 (on the right) with points 1 through 11 extending from the centerline (point 1) out toward the outer rib wall (point 11), and a cross section of a foot 416 (on the left) with points 12 through 22 extending from the central dome (point 12) out along the outer wall of the foot (point 22). Immediately adjacent the CL, at 0.125 inch (point 2), there is a greater thickness in the 17 g flat tip container base, compared to the 17 g spherical tip container base. This greater thickness quickly drops to a lesser thickness at the next data point 0.250 inch (point 3). The area between points 2 and 3 thus has a greater orientation in a container base made with the flat tip end cap design. This area of greater orientation lies in the central dome 48. Beginning at the next data point, 0.375 inch (point 4), the rib wall thicknesses resulting from each preform design substantially track one another, with the rib from the flat tip design being thinner (by a modest amount).

For purposes of comparison, the relative foot wall thicknesses are shown in FIG. 6b. The flat tip design produces a container base having a relatively thinner foot at points 12, 13 and 14 (and continuing radially outwardly thereafter, although to a lesser extent). Thus, the flat tip design produces a generally greater stretch (orientation) and resulting thinner wall, in the central dome area around the center line and extending into a transition region which includes a radial inner portion of the ribs and feet (points 2-3-4 and 12-13-14, respectively).

Table 3 sets forth a comparison of delamination resistance and crack resistance data showing the improved performance for one example of the flat tip design. A 17 g flat tip design (run number 2188) is compared to a 17 g spherical tip design (run number 2194). Another 17 g flat tip design (run number 2189) is compared to another 17 g spherical tip design (run number 2195). Generally, in each case, there is an improvement in all three of burst pressure, drop impact, and a storage simulation testing (except for the drop impact data on the second data set example, which are comparable).

TABLE 3

| | Burst Pressure (psi) | | | Six-Foot Drop Impact | | |
|---|---|---|---|---|---|---|
| Preform Description | Min. | Avg. | # failed below 150 psi | # delaminated | # cracked | Storage Simulation # delaminated |
| 17 g Flat Tip (2188) | 161 | 266 | 0/100 | 15/20 | 5/20 | 8/20 |
| 17 g Spherical Tip (2194) | 68 | 237 | 10/100 | 20/20 | 14/20 | 20/20 |
| 17 g Flat Tip (2189) | 109 | 202 | 12/100 | 12/20 | 3/20 | 14/20 |
| 17 g Spherical Tip (2195) | 99 | 178 | 26/100 | 10/20 | 1/20 | 19/20 |

The following Burst Pressure Test Procedure was used to generate the data in Table 3. The container is pressurized as quickly as possible to a preset pressure of 100 psi, held for 13 seconds, and then the pressure is increased at a rate of 10 psi per second until the container bursts or the maximum applied pressure of 300 psi/100% expansion limit is reached. Record the expanded volume, percent expansion, container pressure, test time, and burst location, if any.

The following Six Foot Drop Impact Test Procedure was used to generate the data in Table 3. Carbonate the containers to the desired level of 4.2 gas volumes (8.25 grams of $CO_2$ per liter of water at STP) using Zahm-Nagle chart or equivalent as reference. Set the containers aside for 18-24 hours to allow them to equilibrate to room temperature. Set the impact apparatus to the test height of 6 feet. Load the samples one at a time into the impact apparatus. Drop the sample vertically onto the metal plate. Analyze the results and record the location and number of delaminations and cracks.

The following Simulated Storage Test Procedure was used to generate the data in Table 3. Record all initial dimensional and volumetric measurements of the empty containers. Fill the containers with carbonated water to achieve starting carbonation level of 4.2 gas volumes. Equilibrate the containers in a well-circulated ambient environment for 18-24 hours. Record all dimensional and volumetric measurements of initial filled containers. Store the containers at 100° F., 85% RH in environmental chamber for 7 days. Again, place the containers in a well-circulated ambient environment for 18-24 hours. Record the final dimensional and volumetric measurements of filled containers. Inspect the containers for any delaminations, cracks, and loss of carbonation.

The above tests are not meant to be limiting but are used to illustrate the improved performance which can be obtained with various embodiments of the invention.

There has thus been described a single-use, single-serve (e.g., 250 ml) CSD multilayer container made from a new 17 gram flat tip preform design, which provides a lighter weight container base (and thus a lower material cost) for a specified performance. Illustrative of the light weighting improvement, a known 250 ml monolayer PET CSD bottle is made from a preform that weighs 27.6 grams. This 27.6 g monolayer preform has a generally spherical end cap design, with generally spherical inner and outer surfaces. An attempt was made to reduce the preform weight to 16 g, while maintaining the spherical end cap design. It was found that containers made from this modified design delaminated shortly after pressurized filling. The containers were also unable to provide an acceptable level of burst pressure. It was only by modifying the preform end cap design, as described herein (the flat tip design), that a substantially lower weight 17 g preform design was achieved that provided the desired pressure and delamination resistance. The difficulty in achieving this improvement was further illustrated by numerous failed attempts to produce an acceptable light weight preform/container base design through adjustments in the blow molding process and/or the placement and/or amount of barrier material layers in the base.

The blow molding process utilized in the embodiment described herein is known as reheat stretch blowing, in which a preform is first injection or compression molded, cooled down to room temperature and stored, and later reheated for the purpose of stretch blow molding. This is in contrast to single stage process in which the preform is molded and, rather than cooling to room temperature, is immediately (after some temperature conditioning) blown into a container. Preforms are generally designed for one or the other of these processes as the temperature profile of the preforms in the respective processes can produce significant differences in stretching and orientation. The injection molded preform design described herein is preferably intended for use with the reheat stretch blow process.

Multilayer containers may utilize adhesive materials, either as separate layers between the barrier and structural polymer layers, and/or as additives to one or more layers in order to increase bonding between the layers and prevent delamination. In accordance with the present invention, the delamination resistance of the layers can be improved without the use of adhesives. However, if desired, further improvements can be obtained by (optionally) utilizing adhesives either in intermediate layers or as an additive to one or more layers.

Preforms and containers useful in the present invention are preferably primarily composed (e.g., greater than 85% of the total preform weight, more preferably greater than 90%, and even more preferably greater than 95%) of a structural polymer such as polyester, provided in one or more layers of the preform sidewall and base. Suitable polyesters include homopolymers, copolymers or blends of various polyesters, such as polyethylene terephthalate (PET), polytrimethylene terephthalate (PTT), polybutylene terephthalate (PBT), polypropylene terephthalate (PPT), polyethylene naphthalate (PEN), polytrimethylene naphthalate (PTN) and a cyclohexane dimethanol/PET copolymer known as PETG (available from Eastman Chemical, Kingsport, Tenn.).

Polyesters based on terephthalic or isothalic acid are commercially available and convenient. Reprocessed polymers, such as scrap or post-consumer PET are widely available for use in beverage containers.

Barrier layers, e.g., providing resistance to transmission of oxygen, carbon dioxide, and/or moisture, may be included in the container base structure. Examples of materials for such barrier layers include ethylene/vinyl alcohol (EVOH), PEN, polyvinyl alcohol (PVOH), polyvinyldene chloride (PVDC), nylon 6, crystallizable nylon (e.g., MXD-6), LCP (liquid crystal polymer), amorphous nylon, polyacrylonitrile (PAN), and styrene acrylonitrile (SAN).

In addition to passive barrier materials, there are active (a.k.a. scavenging) materials available for use in multilayer beverage containers. As used herein barrier material includes both active and passive barrier materials.

Other structural and/or barrier polymers suitable for use in one or more layers include polyamide (PA), polycarbonates, acrylic/imide, polyacrylonitrile (PAN), polystyrene, polyethylene (PE), polypropylene (PP), and polyvinyl chloride (PVC).

The instrinsic viscosity of the thermoplastic polymer affects the processibility of the polymer. Polyester resins for various applications are available having an IV from above 0.55 to about 1.04, and more preferably from about 0.65 to about 0.85 dl/g. Instrinsic viscosity measurements of polyester resins are generally made according to the procedure of ASTM D-2857. In various embodiments of the present invention, it becomes possible to utilize a lower IV, and thus less expensive, polymer material in one or more layers, and still achieve a specified pressure and/or delamination resistance.

The container and base structure will have varying levels of crystallinity due to strain orientation, and optionally thermal induced crystallization. The percent crystallinity may be determined according to ASTM D-1505.

Methods for making multilayer preforms are described in U.S. Pat. No. 4,609,516 to Krishnakumar et al. In the disclosed method, sequential injections of different thermoplastic materials are made into the bottom of an injection mold cavity; the materials flow upwardly to fill the cavity and form, for example, a three layer or a five layer structure. The five layer structure can be made with two materials (the first and third injection materials are the same) or three materials (the first and third injected materials are different). Both structures are in widespread commercial use for beverage and other food containers.

Alternatively, the preform can be produced using compression molding or extrusion molding. Thus, as used herein preform includes a molded article which is typically made by either injection, compression or extrusion molding.

The improved multilayer footed container base described herein has many applications. These include both hot fill and cold fill (beverage filling) technologies, as well as processes which subject container bases to increased pressures and/or temperatures during, for example, sterilization procedures such as to pasteurization and retort. Thus, the improved base design would be useful in a pasteurizable beer container and in a retortable food container. A further application is refillable containers, e.g., refillable carbonated soft drink containers which are subjected to repeated (e.g., 10 or 20) cycles of pressurized filling, and a caustic wash cleaning (e.g., at 60° C.) (following each return by the customer for refilling). See e.g., U.S. Pat. Nos. 4,725,464 to Collette, 5,066,528 to Krishna kumar et al. and 5,989,661 to Krishnakumar et al.

As used herein, pressurized containers include beverage containers adapted to hold carbonated beverages. Generally, such containers are cold filled to provide an initial carbonation pressure of 2.5-4.5 volumes of $CO_2$ (where for example, 3 gas volumes means 3 liters of $CO_2$ dissolved in 1 liter of water at STP, which is equivalent of dissolving 5.89 grams of $CO_2$ in 1 liter of water. Similarly, 4 gas volumes means 4 liters of $CO_2$ dissolved in 1 liter of water at STP, which is the equivalent of dissolving 7.85 grams of $CO_2$ in 1 liter of water.

These and other modifications of the present invention will be apparent to those skilled in the art, and are intended to be included within the scope of the present invention.

The invention claimed is:

1. A plastic container for pressurized applications having a crack resistant multilayer footed base, the container formed by a method comprising:
   providing a molded preform having an end cap region including a multilayer wall, the end cap region including a generally spherical outer surface and a relatively flattened central inner surface providing an end cap thickness profile which includes extending radially outwardly from a central longitudinal axis of the preform:
   a central thickened end cap region;
   an intermediate end cap region which is thinner than the central region; and
   an outer end cap region which is thicker than the intermediate region; and
   blow molding the preform to form a plastic container for pressurized applications having a delamination and crack resistant multilayer footed base.

2. The plastic container of claim 1, wherein the multilayer wall includes at least one layer of a polyester material.

3. The plastic container of claim 2, wherein the multilayer wall includes, adjacent to the at least one polyester layer, a layer of a barrier material for one or more of oxygen, moisture, and carbon dioxide.

4. The plastic container of claim 1, wherein the end cap thickness profile provides a reduction in base weight of the formed container for at least an equivalent pressure resistance compared to a spherical end cap profile having spherical inner and outer walls and the same upper base portion.

5. The plastic container of claim 1, wherein the end cap thickness profile provides a reduction in container base weight for at least an equivalent delamination resistance compared to a spherical end cap profile having spherical inner and outer walls and the same upper base portion.

6. The plastic container of claim 2, wherein the end cap thickness profile enables a reduction in intrinsic viscosity of the polyester polymer for at least an equivalent crack resistance compared to a spherical end cap profile having spherical inner and outer walls and the same upper base portion.

7. The plastic container of claim 1 wherein the container is a single-use beverage container for pressurized liquids.

8. The plastic container of claim 1 wherein the container is a single-use pasteurizable beer container.

9. The plastic container of claim 1 wherein the pressurized applications are: cold-filling with a carbonated beverage, pasteurization, retort and refill.

10. A molded preform for blow molding a plastic container for pressurized applications, the preform having a base with a multilayer wall for forming a delamination and crack resistant multilayer footed container base, the base comprising:
    a generally cylindrical upper base portion;
    an end cap portion having a generally spherical outer wall and a nonspherical inner wall, the nonspherical inner wall having a flattened central section joined by arcuate corner sections to a generally cylindrical outer section forming an extension of the cylindrical upper base portion, wherein the inner wall sections respectively provide a varying end cap thickness profile comprising:
    a central thickened end cap region;
    an intermediate end cap region which is thinner than the central region; and
    an outer end cap region which is thicker than the intermediate region.

11. The preform of claim 10, wherein the multilayer wall includes at least one layer of a polyester material.

12. The preform of claim 11, wherein the multilayer wall includes, adjacent to the at least one polyester layer, a layer of a barrier material for one or more of oxygen, moisture, and carbon dioxide.

13. The preform of claim 10, wherein the end cap thickness profile provides a reduction in base weight of the formed container for at least an equivalent pressure resistance compared to a spherical end cap profile having spherical inner and outer walls and the same upper base portion.

14. The preform of claim 10, wherein the end cap thickness profile provides a reduction in container base weight for at least an equivalent delamination resistance compared to a spherical end cap profile having spherical inner and outer walls and the same upper base portion.

15. The preform of claim 11, wherein the end cap thickness profile enables a reduction in intrinsic viscosity of the polyester polymer for at least an equivalent crack resistance compared to a spherical end cap profile having spherical inner and outer walls and the same upper base portion.

16. The preform of claim 10, wherein the preform is adapted for blow molding a single-use beverage container for pressurized liquids.

17. The preform of claim 10, wherein the preform is adapted for blow molding a single-use pasteurizable beer container.

18. The preform of claim 10, wherein the pressurized applications are:
    cold-filling with a carbonated beverage, pasteurization, retort and refill.

19. An improved injection-molded preform for blow molding a single-use plastic beverage container for pressurized liquids having a multilayer footed base, the preform having an end cap region including a multilayer wall with a layer of a polyester material and an adjacent layer of a different polyester or nonpolyester material, the improvement comprising:
providing a non-spherical preform end cap region to form a delamination and crack resistant pressurized container base of reduced weight, wherein the non-spherical end cap region has a thickness which includes:
a relatively flattened central inner surface forming a central thickened end cap region;
an intermediate region surrounding the central region which is thinner than the central region; and
an outer end cap region surrounding the intermediate region which is thicker than the intermediate region.

20. A method of making a delamination and crack resistant multilayer footed base of a plastic container for pressurized applications, the method comprising:
providing a molded preform having an end cap region including a multilayer wall, the end cap region including a generally spherical outer surface and a relatively flattened central inner surface providing an end cap thickness profile which includes extending radially outwardly from a central longitudinal axis of the preform:
a central thickened end cap region;
an intermediate end cap region which is thinner than the central region; and
an outer end cap region which is thicker than the intermediate region; and
blow molding the preform to form a plastic container for pressurized applications having a delamination and crack resistant multilayer footed base.

21. The method of claim 20, wherein upon the blow molding, the central end cap region forms a central thickened portion of the base of the formed container, and the intermediate end cap region forms a transition region between the central portion and a plurality of foot pads on which the container rests.

22. The method of claim 21, wherein the transition region has at least 10% greater orientation compared to a transition region of a container base made from a preform having a spherical end cap profile with spherical inner and outer surfaces.

23. The method of claim 22, wherein the transition region includes an inner wall portion of each foot of the formed footed container and an inner rib portion between two feet.

24. The method of claim 20, wherein the end cap thickness profile provides a weight reduction in the container base of at least 5% compared to a container base made from a preform having a spherical end cap profile with spherical inner and outer surfaces.

25. The method of claim 24, wherein the weight reduction is at least 10%.

26. The method of claim 20, wherein the preform is formed into a container having a pressurized shelf life of at least 8 weeks.

27. The method of claim 26, wherein the pressurized shelf life is at least 16 weeks.

28. The method of claim 20, wherein the preform is formed into a carbonated beverage container having a volume of 500 milliliters (ml) or less.

29. The method of claim 28, wherein the volume is 250 ml or less.

30. The method of claim 20, wherein the preform is formed into a 250 ml carbonated soft drink container having a minimum burst pressure of at least 150 pounds per square inch (psi).

31. The method of claim 30, wherein the container has an average burst pressure of at least 175 psi.

32. The method of claim 31, wherein the container has a base weight of no greater than 6 grams (g).

33. The method of claim 32, wherein the base weight is no greater than 4 g.

34. The method of claim 20, wherein the preform is formed into a carbonated beverage container having a volume of 1 to 3 liters (l).

35. The method of claim 20, wherein the blow molding step includes stretch blow molding.

36. The method of claim 35, wherein the stretch blow molding is performed with a stretch rod having a flattened tip that engages the intermediate end cap region.

37. The method of claim 20, wherein the preform is formed into a single-use food or beverage container adapted for at least one of hot-filling, cold-filling, pasteurization.

38. The method of claim 20, wherein the preform is formed into a pasteurizable beer container.

39. The method of claim 20, wherein the preform is formed into a retortable or refillable container.

40. The method of claim 20, wherein the preform is formed into a single-use beverage container for pressurized liquids.

41. The method of claim 40, wherein the multilayer wall includes at least one layer of a polyester material and an adjacent layer of a nonpolyester material.

42. The method of claim 41, wherein the nonpolyester material is a barrier material for one or more of oxygen, moisture and carbon dioxide.

* * * * *